United States Patent
Elliott et al.

(10) Patent No.: US 7,180,884 B2
(45) Date of Patent: Feb. 20, 2007

(54) METHOD AND APPARATUS FOR VARYING THE RATE AT WHICH BROADCAST BEACONS ARE TRANSMITTED

(75) Inventors: Brig Barnum Elliott, Arlington, MA (US); William S. Passman, Lexington, MA (US); John R. Zavgren, Acton, MA (US); Joseph J. Weinstein, Somerville, MA (US)

(73) Assignee: BBN Technologies Corp., Cambridge, MA (US)

( * ) Notice: Subject to any disclaimer, the term of this patent is extended or adjusted under 35 U.S.C. 154(b) by 0 days.

(21) Appl. No.: 10/375,388

(22) Filed: Feb. 27, 2003

(65) Prior Publication Data

US 2003/0128690 A1 Jul. 10, 2003

Related U.S. Application Data

(62) Division of application No. 09/584,973, filed on Jun. 1, 2000, now abandoned.

(51) Int. Cl.
*H04Q 7/24* (2006.01)
*H04J 1/16* (2006.01)
(52) U.S. Cl. .................................. 370/338; 370/465
(58) Field of Classification Search ................ 370/338, 370/349, 350, 500, 509
See application file for complete search history.

(56) References Cited

U.S. PATENT DOCUMENTS

| | | | |
|---|---|---|---|
| 5,093,824 A | 3/1992 | Coan et al. ............... 370/16 |
| 5,243,592 A | 9/1993 | Perlman et al. ............... 370/17 |
| 5,475,866 A | 12/1995 | Ruthenberg ................ 455/33.1 |
| 5,548,818 A | 8/1996 | Sawyer et al. ............. 455/54.1 |
| 5,787,348 A * | 7/1998 | Willey et al. ................ 370/332 |
| 5,794,146 A | 8/1998 | Sevcik et al. ................ 455/434 |
| 5,809,083 A | 9/1998 | Wright ........................ 375/285 |
| 5,812,531 A | 9/1998 | Cheung et al. .............. 370/255 |
| 5,850,592 A | 12/1998 | Ramanathan ................... 455/7 |
| 5,881,246 A | 3/1999 | Crawley et al. ........ 395/200.68 |
| 5,912,921 A * | 6/1999 | Warren et al. .............. 370/332 |
| 5,913,921 A | 6/1999 | Tosey et al. ................. 709/220 |
| 5,974,327 A | 10/1999 | Agrawal et al. ............ 455/452 |
| 5,987,011 A | 11/1999 | Toh ............................ 370/331 |
| 5,987,024 A | 11/1999 | Duch et al. ................. 370/350 |
| 6,018,642 A * | 1/2000 | Adachi ....................... 340/7.33 |
| 6,088,591 A | 7/2000 | Trompower et al. ........ 455/438 |
| 6,138,019 A * | 10/2000 | Trompower et al. ........ 455/436 |
| 6,141,788 A * | 10/2000 | Rosenberg et al. ......... 714/774 |

(Continued)

OTHER PUBLICATIONS

Link-State Routing, John Moy, Ch. 5, Routing in Communications Networks, ed. Martha Steenstrup, Prentice Hall, 1995.

(Continued)

Primary Examiner—Andrew C. Lee
(74) Attorney, Agent, or Firm—Fish & Neave IP Group Ropes & Gray LLP

(57) ABSTRACT

In an apparatus for varying the rate at which the broadcast beacons are transmitted, there is at least one router (2). The router transmits beacons which contain various types of data, controls the rate at which the beacons are transmitted, and adaptively varies the rate at which the beacons are transmitted, in response to a variety of network conditions.

56 Claims, 10 Drawing Sheets

U.S. PATENT DOCUMENTS

| | | | | |
|---|---|---|---|---|
| 6,377,608 | B1* | 4/2002 | Zyren | 375/132 |
| 6,466,608 | B1* | 10/2002 | Hong et al. | 375/137 |
| 6,512,935 | B1* | 1/2003 | Redi | 455/574 |
| 6,650,655 | B2* | 11/2003 | Alvesalo et al. | 370/468 |
| 2003/0016732 | A1 | 1/2003 | Miklos et al. | |

OTHER PUBLICATIONS

Packet Radio Routing, Gregory S. Lauer, Ch. 11, Routing in Communications Networks, ed. Martha Steenstrup, Prentice hall, 1995.

Packet Radio Network Routing Algorithums: A Survey, J.J. Hahn et al., IEEE Communications Magazine, vol. 22, No. 11, Nov. 1984, pp. 41-47.

The Organization of Computer Resources into a Packet Radio Network, R.E. Kahn, IEEE Trans. On Communications, vol. COM-25, No. 1, Jan. 1977, pp. 169-178.

Analysis of Routing Strategies for Packet Radio Networks, J.J. Garcia Lune Aceves et al., Proc. Of the IEEE INFOCOM '85, Washington, DC, Mar. 1985, pp. 292-302.

The DARPA Packet Radio Network Protocols, J. Jubin et al., Proc. Of the IEEE, vol. 75, No. 1, Jan. 1987, pp. 21-32.

* cited by examiner though the jittering technique avoids network synchronization, it has limitations. For example, conventional networks with routers that transmit jittered beacon broadcasts are unable to selectively vary the rate of beacon transmission in response to varying network conditions and, thus, are unable to achieve maximum routing efficiency.

METHOD AND APPARATUS FOR VARYING THE RATE AT WHICH BROADCAST BEACONS ARE TRANSMITTED

CROSS-REFERENCE TO RELATED APPLICATION

This application is a division of application Ser. No. 09/584,973, filed Jun. 1, 2000 now abandoned.

BACKGROUND OF THE INVENTION

1. Field of the Invention

The present invention relates to a method and apparatus for varying the rate at which broadcast beacons are transmitted, and more particularly, for adaptively adjusting the rate of transmission in response to varying network conditions.

2. Related Art

In a wireless ad hoc network, all nodes of the network are equipped with wireless communications transceivers. Some of these nodes, commonly known as routers, are capable of network routing functions. Other of the nodes, commonly known as "endpoints," are sources or destinations for data traffic.

Each node in an ad hoc network executes a set of algorithms and performs a set of networking protocols, which enable the nodes to locate other nodes. The networking protocols also enable the nodes to determine paths through the network for sending and receiving data traffic from source to destination. Additionally, the protocols enable the nodes to detect and repair ruptures in the network as nodes move, as nodes fail (i.e., leave the network), as battery power changes, as communications path characteristics change over time, and the like.

Certain types of wireless ad hoc networks employ beacons as a means by which network nodes can discover other nearby nodes. A beacon is a broadcast transmission that can be received by some or all of the nodes within transmission range. In some network schemes, all of the nodes in the network can broadcast beacons; in other networks, only a subset of the nodes can broadcast beacons.

Typically beacons contain information such as an identification of the node that is transmitting the beacon, forwarding error correction information, and other fields depending on the type of wireless networking protocols being employed in the ad hoc network.

Ad hoc wireless networks consisting of self-healing groups of network nodes typically transmit beacons at a fixed time interval or from a set of fixed time intervals. In some conventional networks, the intervals are "jittered" by adding a randomized offset to the fixed time interval to prevent system-wide synchronization of the beacon transmissions. While the jittering technique avoids network synchronization, it has limitations. For example, conventional networks with routers that transmit jittered beacon broadcasts are unable to selectively vary the rate of beacon transmission in response to varying network conditions and, thus, are unable to achieve maximum routing efficiency.

SUMMARY OF INVENTION

Among the several objects of the present invention, is to adjust the beacon rate in accordance with varying system conditions so that less channel capacity is utilized.

Another objective of the present invention is to adjust the beacon rate in response to high-error channels to compensate for beacons that are lost due to transmission errors.

It is also an object of the present invention to adjust the beacon rate to conserve available power for nodes that have a greater need for power. Conversely, another objective of the present invention is to adjust the beacon rate to increase the power utilization for nodes that have less of a need to conserve power.

An additional objective of the present invention is to adjust the beacon rate based on application-dependent load factors so as to bias network nodes toward interactions with nodes that are relatively unloaded.

According to the invention, an apparatus for varying the rate at which beacons are transmitted in an ad hoc wireless network, has at least one router. The router transmits beacons containing various types of data, controls the rate at which beacons are transmitted, and adaptively varies the rate at which the beacons are transmitted.

According to one aspect, the router is equipped with a wireless communications transceiver.

According to another aspect, the data transmitted by the beacons identifies the router transmitting the beacons.

In another aspect, the data transmitted by the beacons indicates a current time interval at which the router is transmitting beacons.

In still another aspect, the router is capable of network routing functions.

In another aspect, the router is a destination for data traffic

According to another aspect, the rate at which the beacons are transmitted is varied in response to a start-up operation of the router. The start-up operation can occur when the router is first powered, when the router first enters a network and/or when the router first begins to act with a new role in a network. Initially, the rate is increased in response to the start-up operation. After a predetermined period of time, the increased rate is decreased to a slower rate.

In yet another aspect, the rate at which the beacons are transmitted is varied in response to a mobility rate of the router. The rate is increased in response to an increase in the mobility rate of the router and decreased in response to a decrease in the mobility rate of the router. The mobility rate can be measured by physical speed, a change in wireless channel connectivity with other routers, or by expected plans for future movement.

Another aspect involves varying the rate at which beacons are transmitted in response to the density of the ad hoc wireless network. The rate is increased in response to a low density network and decreased in response to a high density network.

In another aspect, the rate at which the beacons are transmitted is varied in response to a communication channel characteristic. The rate is increased in response to a communication channel with a high error rate and decreased in response to a communication channel with a low error rate.

In yet another aspect, the rate at which the beacons are transmitted is varied in response to the amount of data traffic. The rate is increased when a wireless communication channel has a small amount of data traffic and decreased when a wireless communication channel has a large amount of data traffic.

In still another aspect, the rate at which the beacons are transmitted is varied in response to an amount of power available for wireless channel transmissions. The rate at which the beacons are transmitted is decreased when there is a small amount of power available and increased when there is a large amount of power available.

In another aspect, the rate at which the beacons are transmitted is varied in response to an application load of the router. The rate at which the beacons are transmitted is increased in response to an application load that is small and decreased in response to an application load that is large.

According to one embodiment, a method for varying the rate at which beacons are transmitted in an ad hoc wireless network includes the steps of transmitting beacons containing various types of data; controlling the rate at which the beacons are transmitted; and adaptively varying the rate at which the beacons are transmitted.

According to another embodiment, a computer executable software code stored on a computer readable medium, the computer executable code for varying the rate at which beacons are transmitted in an ad hoc wireless network, the code comprises computer executable code for transmitting beacons containing various types of data; computer executable code for controlling the rate at which the beacons are transmitted; and computer executable code for adaptively varying the rate at which the beacons are transmitted.

In another embodiment, a network communication apparatus comprises means for transmitting beacons containing various types of data; means for controlling the rate at which the beacons are transmitted; and means for adaptively varying the rate at which the beacons are transmitted.

The foregoing and other objects, advantages, and features of the present invention will become more apparent from the following detailed description of the preferred embodiments taken in conjunction with the accompanying drawings.

DETAILED DESCRIPTION OF THE PREFERRED EMBODIMENTS

In the present invention, an additional piece of information is included in the broadcast beacons, specifically, an indication of the current time interval at which the node is transmitting beacons. For example, a node's beacon may contain a field with a value of 1, to indicate that the node is currently transmitting 1 beacon per second. An additional field may also be included to indicate the time unit which is being utilized for setting the beacon transmission rate. For example, a node's beacon may include a field that indicates whether the intervals are being described in seconds, minutes, milliseconds, etc.

The present invention adaptively adjusts the rate at which a given node transmits its broadcast beacons. The rate is adjusted in response to factors such as the amount of time that the node has been active or operating in a specialized state (i.e., startup), the node's velocity, the rate at which the node's wireless connectivity is changing, the density of wireless network nodes in the vicinity, the changing transmission characteristics of a wireless communication channel, and so forth.

Adaptively adjusting the beacon rate enables an entire network to respond more rapidly to the addition of new nodes, or to changes in network connectivity that more efficiently utilize the wireless communications channel capacity, and that perform more robustly in the presence of a large amount of noise in the communications channel.

The preferred embodiments will be described with respect to a wireless mobile communications node and to a network formed by a plurality of similar nodes. However, the present invention is not limited to the wireless mobile communications field. Instead, the invention is applicable to many other types of networks, including cellular telephone systems, wireless metropolitan area networks, wireless local area networks, home wireless networks, low-power networks used for connecting personal devices, and so forth.

Figure 1:
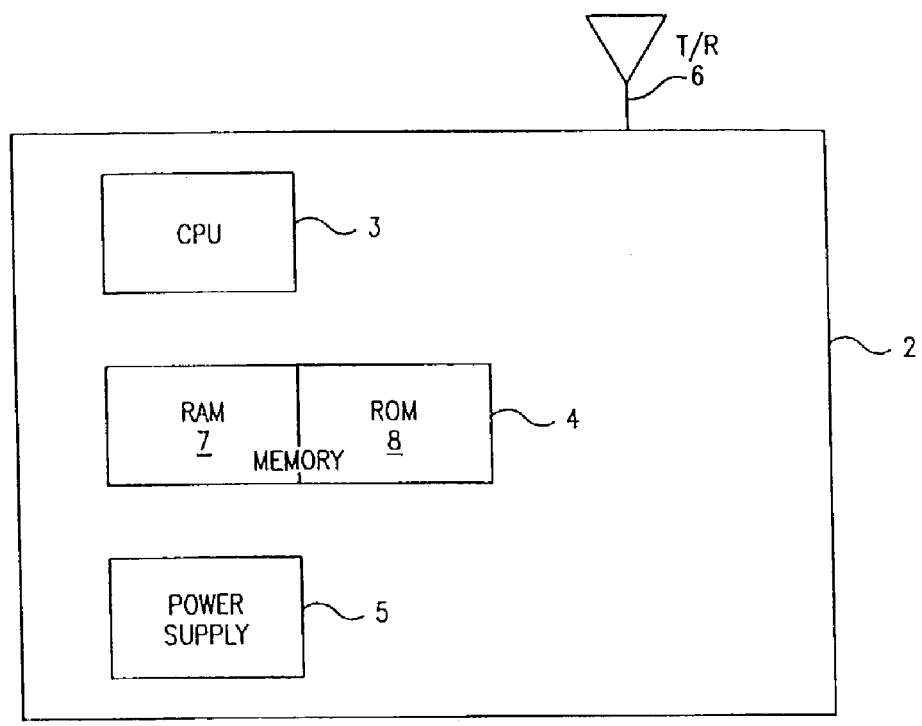
FIG. 1 is a block diagram of a communication node.

Each node in the ad hoc network is equipped with a wireless communications transceiver. FIG. 1 depicts an exemplary node 2 and includes a central processing unit (CPU) 3, a memory 4 comprising RAM 7 and ROM 8 (suitable for storing computer executable software therein), a power supply 5, and a transceiver 6 (e.g., a transmitter and a receiver). Alternatively, the mobile station 2 may include more than one transmitter and/or more than one receiver. The mobile station 2 can also include an Ethernet interface, as well as other interfacing ports. With these arrangements, the mobile station 2 is able to simultaneously communicate with more than one station. Communication with multiple stations can occur, for example, through different channels (or "communication links"), and/or by transmitting specific identifying information (or "coded information") for each intended source or target.

Figure 2:
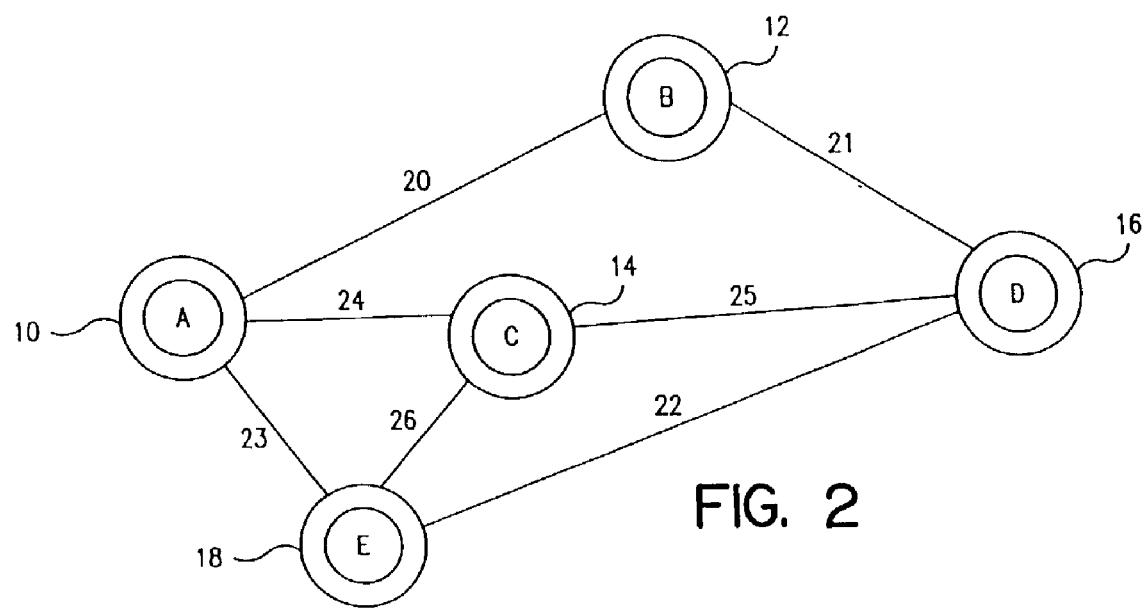
FIG. 2 is a diagram illustrating an ad hoc wireless network configuration in accordance with the present invention.

FIG. 2 is a schematic diagram of radio nodes in a wireless network according to the present invention. Five routers 10, 12, 14, 16, and 18 comprise the wireless network. Established channels or data communication links connecting the various routers are designated by reference characters 20-26.

While FIG. 2 illustrates a particular interconnection of the various stations shown, it should be understood that this configuration of connections is not pre-determined and that other patterns of connections might easily arise in accordance with the present invention. Moreover, the pattern of connections can change during operation, both to accommodate the introduction of new stations and to allow for the withdrawal or movement of one of the nodes. The mode of operation of each router is controlled by an embedded microprocessor (e.g. the CPU) and the method of operation described herein is intended to be implemented automatically by the programming of the microprocessors.

Figure 3:
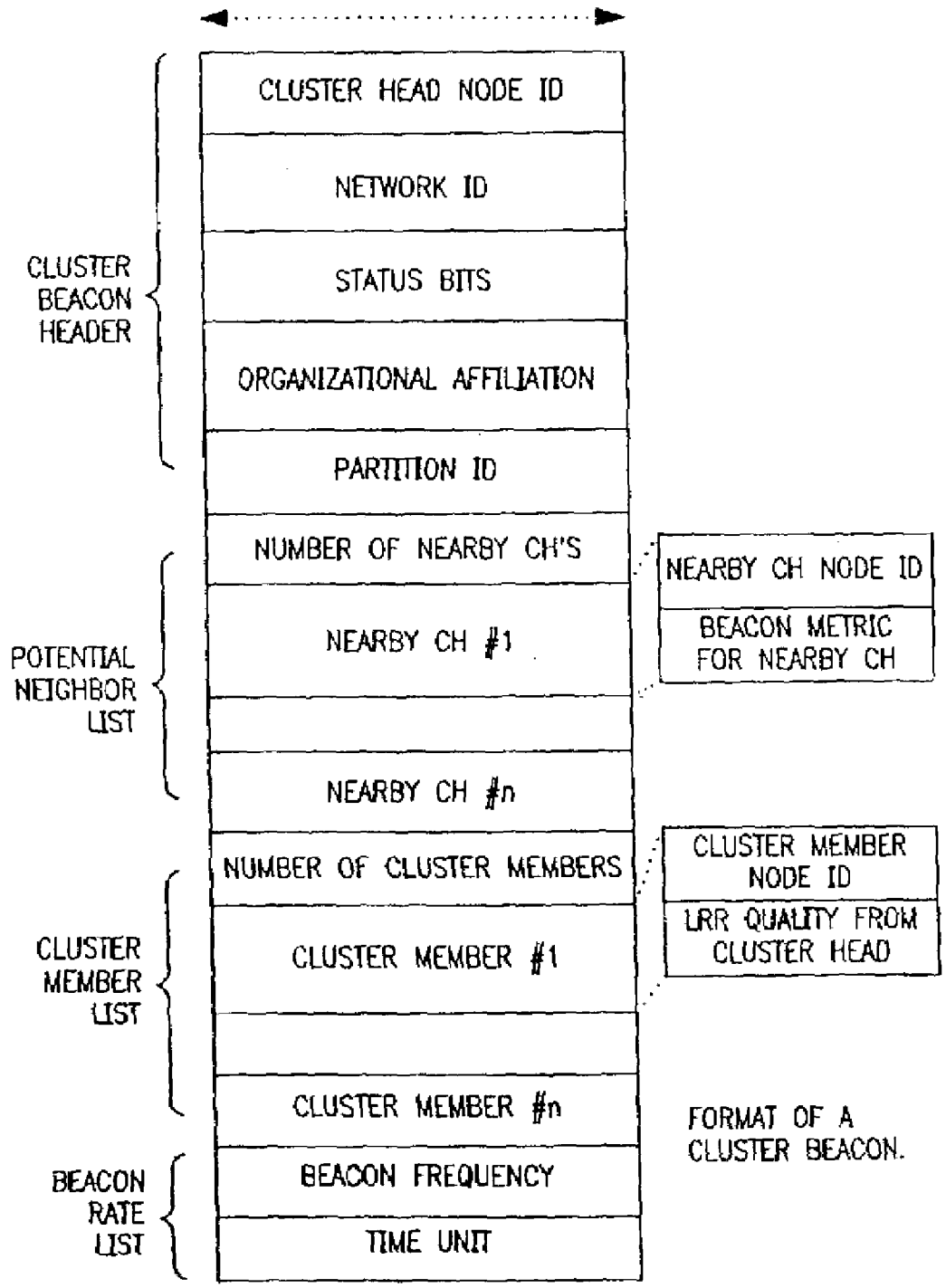
FIG. 3 is a diagram illustrating a format of a broadcast beacon.

The aforementioned types of information transmitted in the broadcast beacon can be transmitted in the format shown in FIG. 3. The illustrated beacon is a cluster head beacon (i.e., a beacon transmitted by a cluster head). The format includes four main categories of information; namely, a Cluster Beacon Header, a Potential Neighbor List, a Cluster Member List, and a Beacon Rate List.

The Cluster Beacon Header identifies the node issuing the beacon. Such identification information can include a cluster head node ID, a network ID, the status of the node, organizational affiliation (i.e., command, support, administrative function, etc.), and a partition ID.

The Potential Neighbor List can include a field related to a node identification, a node-specific sequence number, and a list of potential neighbors. The information can also include a node identifier of each potential neighbor, and a metric describing the cost of linking that potential neighbor and the cluster head issuing the beacon. The node specific sequence number ensures that the most-up-to-date list is utilized.

The Cluster Member List identifies those nodes that are affiliated with the cluster head. This member list can include non-gateway nodes, gateway nodes, or a combination of the two. The Cluster Member List includes fields directed to the number of cluster members and actual cluster member entries. The Number of Cluster Members field contains the current number of members that are affiliated with the cluster head, and the Cluster Member Entry field identifies the members that are currently affiliated with the cluster head. Each of the Cluster Member entries includes the cluster members node ID, and a quality index calculated by the cluster head. The quality index allows other nodes in the network to evaluate the links between the particular cluster head and the cluster member.

The Beacon Rate List indicates the current time interval at which the node is transmitting beacons. The Beacon Frequency field includes a numerical value which represents the current rate of transmission. The Time Unit field indicates the unit of time (i.e., seconds, minutes, milliseconds, etc.) used to represent the rate of transmission.

The current invention is not limited to the format illustrated in FIG. 3. Numerous variations of this format are possible depending on the type of wireless networking protocols being employed.

Figure 4:
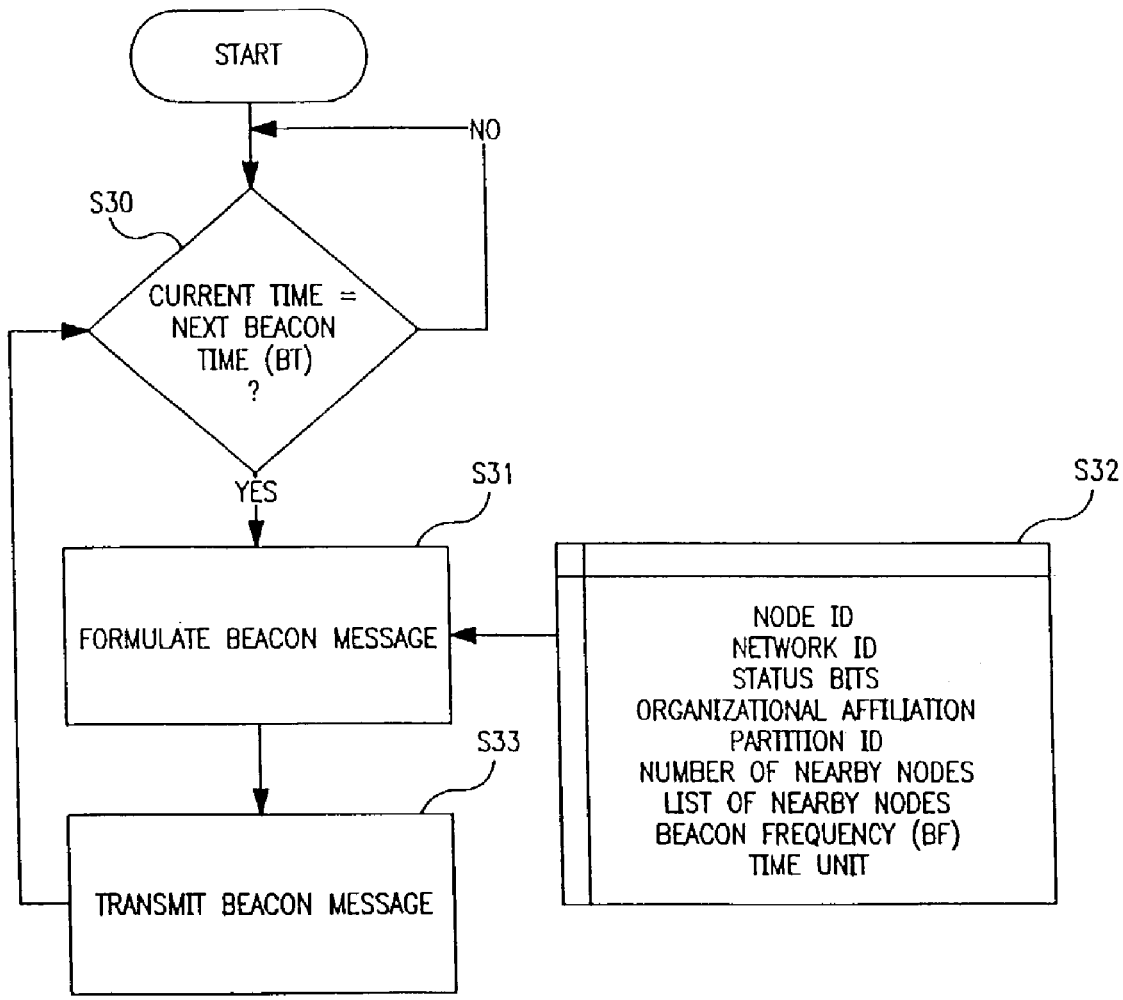
FIG. 4 is a flowchart illustrating a procedure for transmitting a broadcast beacon.

The flowchart in FIG. 4 illustrates a basic procedure for transmitting a broadcast beacon. In step S30 a determination is made regarding whether the current time equals the next beacon time (BT). If the current time does equal the next beacon time, then the node formulates a beacon message in step S31, otherwise no beacon is transmitted. After the beacon message is formulated it is transmitted in step S33. The beacon message may contain node identification information, network identification information, status bits, organizational affiliation information, the partition ID, the number of nearby nodes, a list of nearby nodes, the beacon frequency, and the relevant time unit as shown, for example, in step S32. While the content and format of the beacon message may vary, the beacon should contain at least the transmitting node's ID, which is a unique identifier for that node.

One or more algorithms may be used to control the rate at which a given node transmits its beacons. Such algorithms may even be used to turn off a node's beacons entirely. The various types of algorithms facilitate a variation in the rate of beacon transmission that is responsive to a wide variety of network conditions.

One algorithm involves varying the beacon rate in response to a startup condition of a node. When a node is first powered on, first enters a network, or first begins to act with a new role in a network, it may beacon at a speed that is faster than its normal beacon rate. This increased rate of beacon transmission allows other nodes to discover its presence more quickly than if the beacons were merely transmitted at the normal beacon rate.

The faster beacon rate also enables the disseminating node to perform those calculations that are based on an averaging process across a number of beacon receptions. Such calculations may include, for example, calculation of the average received signal strength or "k" of "n" successful receptions, and so forth. After some period of initial fast-beaconing, the node begins to transmit beacons at a slower, normal rate. Resuming this normal rate uses less of the channel capacity than beaconing at the faster rate and hence frees up more channel capacity for actual data traffic throughput.

Figure 5:
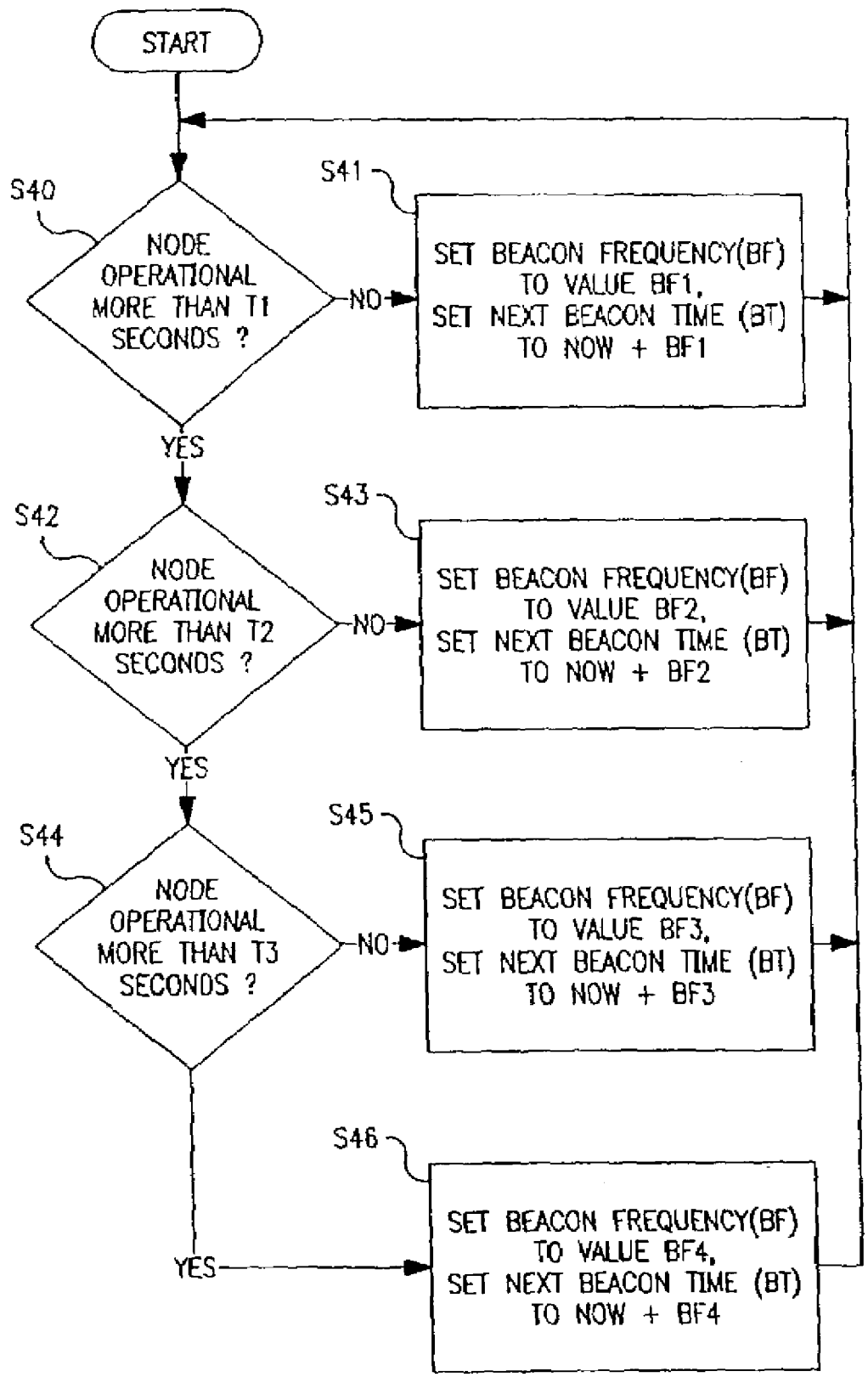
FIG. 5 is a flowchart illustrating a procedure for varying the rate at which beacons are transmitted by a router in response to a start-up operation of the router.

FIG. 5 is a flowchart illustrating the above-described Startup Beaconing procedure for varying the beacon transmission rate in response to a start-up operation of the router. In step S40, it is determined whether the node has been operational for more than T1 seconds. If not, then in step S41 the beacon frequency (BF) is set to a value of BF1 and the next beacon time (BT) is set to a value that equals the current time plus BF1.

If the node has been operational for more than T1 seconds, then a determination is made in step S42 regarding whether the node has been operational for more than T2 seconds. If the node has been operational for more than T1 seconds, but less than T2 seconds, then in step S43 the beacon frequency is set to a value of BF2 and the next beacon time is set to a value equivalent to the current time plus BF2.

If the node has been operational for more than T2 seconds, then in step S44 a determination is made regarding whether the node has been in operation for more than T3 seconds. If the node has been operational for more than T2 seconds and less than T3 seconds, then in step S45 the beacon frequency is set to a value of BF3 and the next beacon time is set to equal the current time plus BF3. However, if the node has been operational for more than T3 seconds, the beacon frequency is set to equal BF4 and the next beacon time is set to a value of the current time plus BF4.

Another algorithm relates to varying the beacon transmission rate in response to the mobility rate of the router. One of the key characteristics of ad hoc networks is that the various nodes are highly mobile. The high level of router mobility necessitates that the routers be able to respond quickly to changes in the network.

This algorithm causes a node that is moving quickly to beacon faster than a node that is moving slowly. Such rapid beaconing allows new neighbors (i.e., nodes that are now coming into wireless communication range of the moving node) to discover the node more quickly. Similarly it allows nodes that are falling out of wireless communication range to determine that the moving node is passing out of range.

However, nodes that are moving slower transmit beacons less often. By such an arrangement, slower moving nodes use less of the available channel capacity.

The rate of node movement can be measured by a variety of techniques, including the measurement of physical speed, the change in wireless channel connectivity with nearby neighbor nodes, expected plans for future movement, and so forth.

Figure 6:
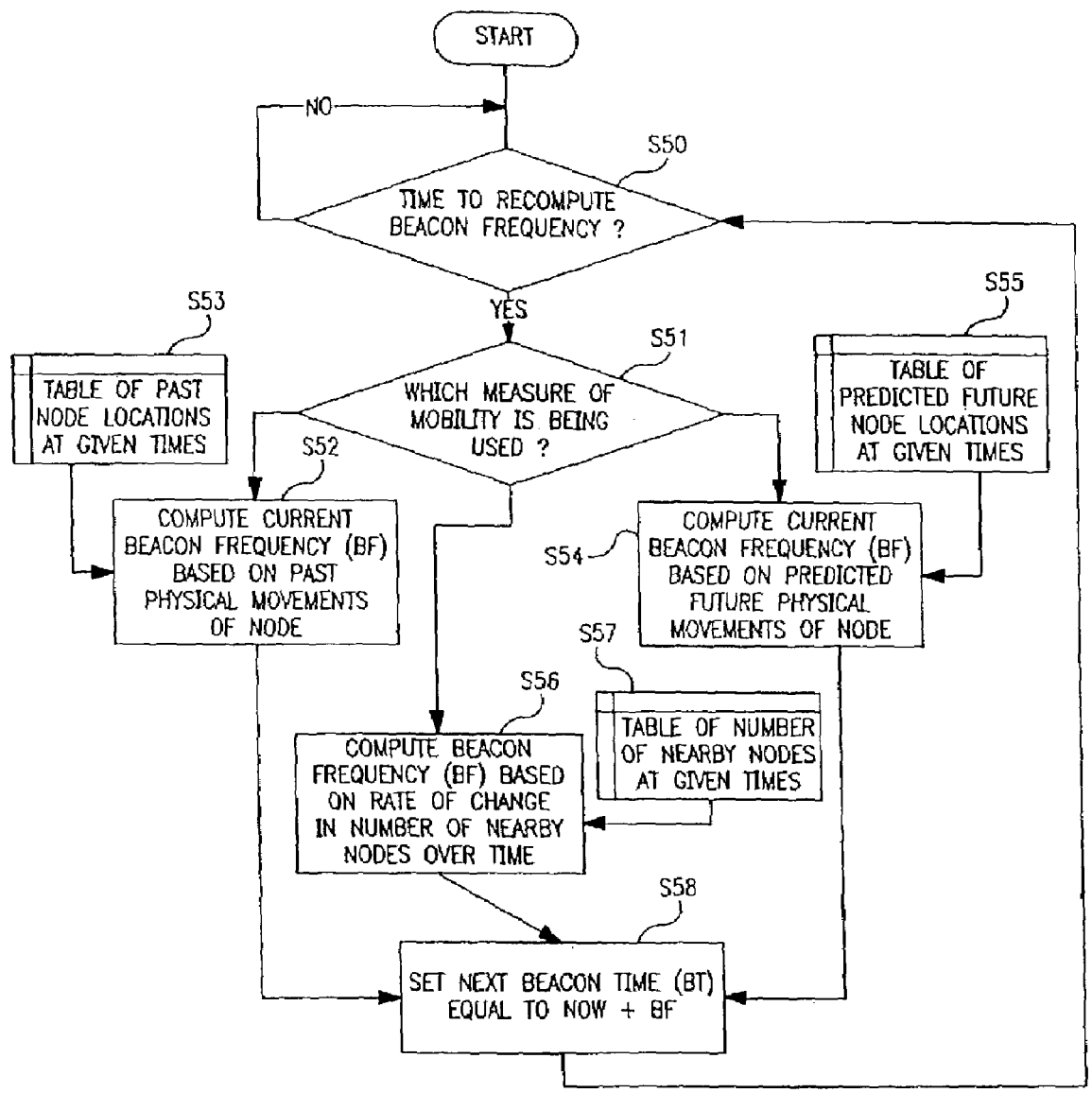
FIG. 6 is a flowchart illustrating a procedure for varying the rate at which beacons are transmitted by a router in response to a mobility rate of the router.

The High Mobility Beaconing procedure for varying the rate of beacon transmission, in response to the mobility rate of the router, is illustrated in FIG. 6. In step S50 it is determined whether it is time to recompute the beacon frequency. If not, then the beacon frequency remains the same. If it is, in fact, time to recompute the beacon frequency, then a determination is made in step S51 regarding which measure of mobility is being utilized. If the node mobility is being measured in step S52 based on past physical movements, then a table of past node locations at given times (S53) is used to compute the current beacon frequency.

If the node mobility is measured in step S54 based on predicted future physical movements of the node, then a table of predicted future node locations at given times (S55) is used to compute the current beacon frequency.

Moreover, if the mobility of the node is measured in step S56 based on the rate of change in nearby nodes over time, then a table of the number of nearby nodes at given times (S57) is used to compute the beacon frequency.

After using one of the above-mentioned measures of mobility to compute beacon frequency, the next beacon time is set in step S58 to equal the current time plus the beacon frequency calculated in either steps S52, S54, or S56.

According to the Density-Dependent Beaconing algorithm, a node that is in a dense network or a dense portion of a network may beacon less often than one that is in a less dense network or a less dense area of a network. The reduction of the beacon transmission rate for a node in a high density environment has the overall effect of reducing the percentage of the wireless communications channel that is occupied by beacon transmissions in a particular vicinity. This arrangement enables the overall beaconing in a network to be held to within certain configured or calculated bounds rather than rising to occupy all, or an unacceptably large fraction of the total wireless communications channel capacity.

Density can be measured in a variety of ways. Measurement techniques include, for example, measuring the number of nodes per unit area or volume, determining the number of nodes in wireless communication range, evaluating the expected plans for future movement or adjustments to transmission of power that may affect the network density, and so forth.

Figure 7:
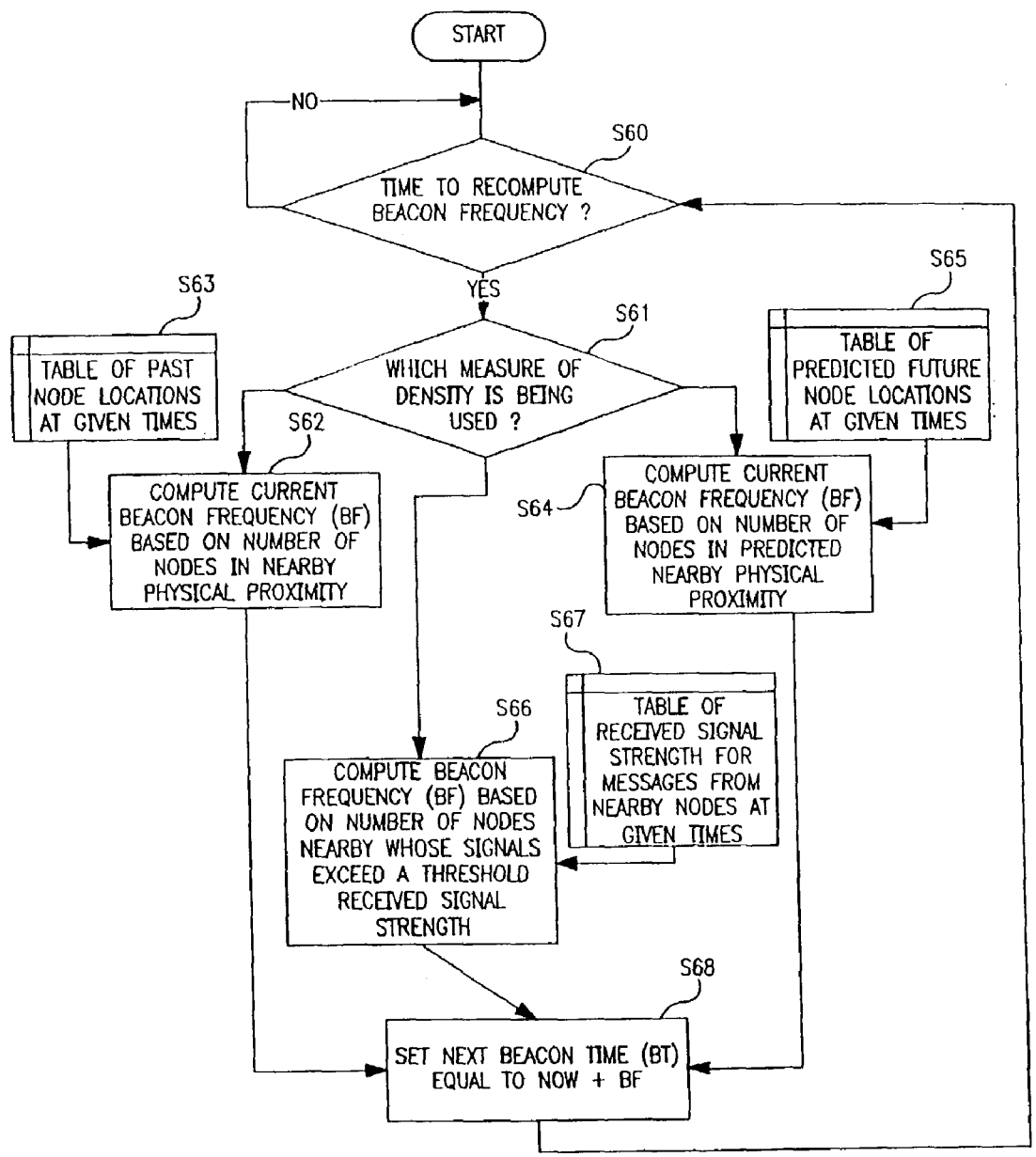
FIG. 7 is a flowchart illustrating a procedure for varying the rate at which beacons are transmitted by a router in response to the density of the ad hoc wireless network.

FIG. 7 is a flowchart illustrating the Density-Dependent Beaconing procedure for varying the beacon transmission rate in response to the density of an ad hoc wireless network.

In step S60 of this procedure it is determined whether it is time to recompute the beacon frequency. If not, then the beacon frequency remains the same. If, however, it is time to recompute the beacon frequency, then a determination is made in step S61 regarding which measure of density is being used.

If the density is measured in step S62 based on the number of nodes in nearby physical proximity, then a table of past node locations at given times (S63) is used to calculate the current beacon frequency.

When the density is measured in step. S64 based on the number of nodes in predicted nearby physical proximity, then a table of predicted future node locations at given times (S65) is used to compute the current beacon frequency.

If the density is measured in step S66 based on the number of nodes nearby whose signals exceed a threshold received signal strength, then a table of received signal strength for messages from nearby nodes at given times is used to calculate the current beacon frequency.

After using one of the above-mentioned density measurement methods to compute beacon frequency, the next beacon time is set in step S68 to equal the current time plus the beacon frequency calculated in one of steps S62, S64, or S66.

Another algorithm involves varying the rate of beacon transmission in response to a communication channel characteristic. When a node is experiencing a wireless communication channel which has a high error rate, the algorithm increases the rate at which the node transmits broadcast beacons. This increased rate compensates for the beacons that are lost due to transmission errors.

Nodes may determine the channel characteristic directly by measuring the wireless channel or reception characteristics of transmission from other network nodes. Additionally, the channel characteristic may be determined indirectly through messages that provide feedback on reception rates from other network nodes. A combination of these two techniques may also be used.

Rapid beaconing in high-error channels allows other nodes to receive a relatively constant number of undamaged beacons per interval time, rather than having their reception of undamaged beacons decline as the channel error rate increases. As a result, nodes are able to perform time-dependent aggregated processing on the received beacons, such as, for example, average received signal strength, "k" of "n" successful receptions, etc.).

Figure 8:
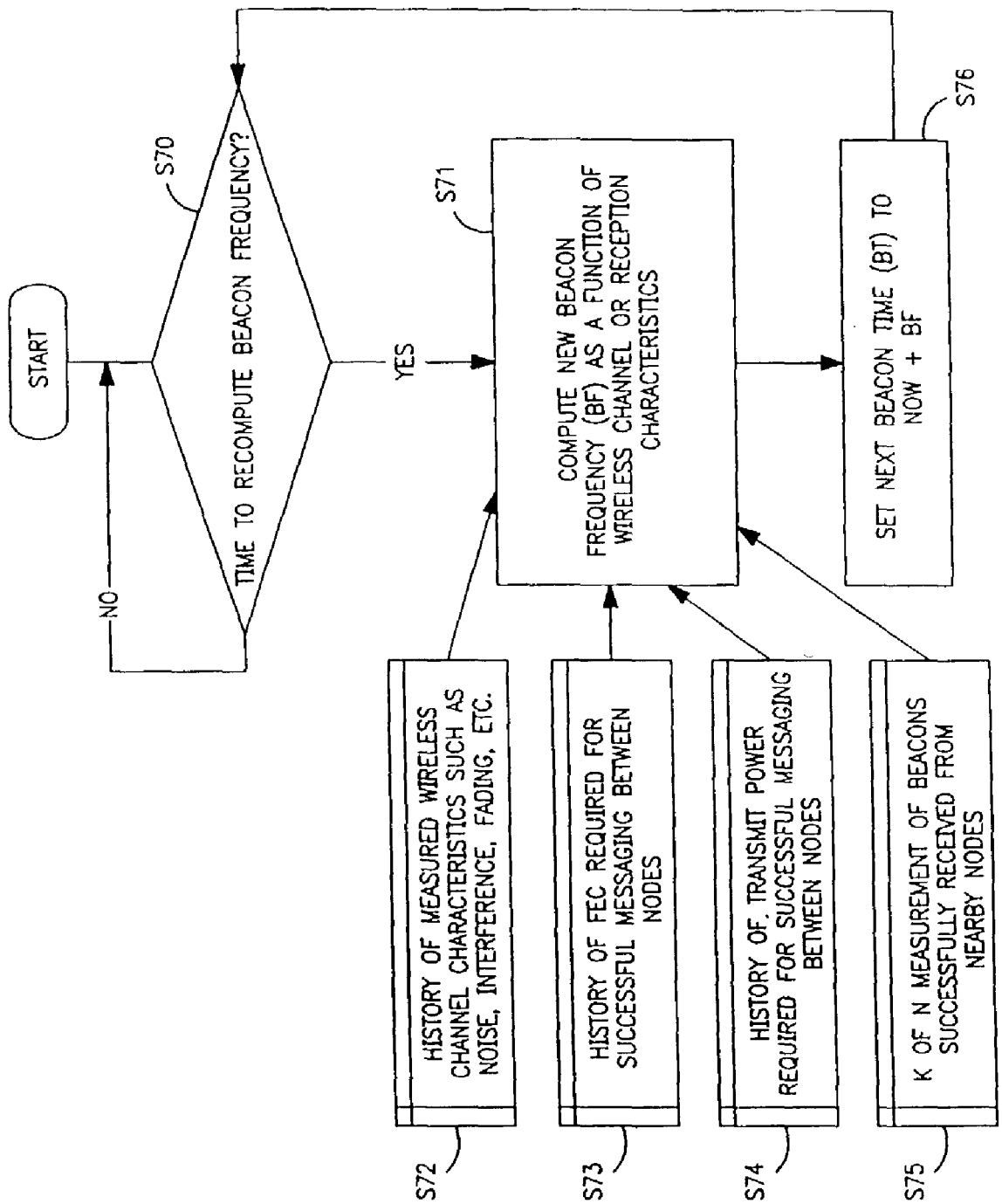
FIG. 8 is a flowchart illustrating a procedure for varying the rate at which beacons are transmitted by a router in response to a communication channel characteristic.

FIG. 8 is a flowchart illustrating the Channel-Dependent Beaconing procedure for varying the rate at which beacons are transmitted in response to a communication channel characteristic.

If it is time to recompute the beacon frequency according to step S70, then the new beacon frequency is computed in step S71 as a function of wireless channel or reception characteristics. Several types of channel characteristic historical information can be used in this computation, including the history of measured wireless channel characteristics such as noise, interference, fading, etc. (S72); the history of forward error correction (FEC) required for successful messaging between nodes (S73); the history of transmit power required for successful messaging between nodes (S74); and the K of N measurement of beacons successfully received from nearby nodes (S75). After using this information, either individually or in combination to calculate the new beacon frequency, the beacon time is set in step S76 to be the current time plus the calculated beacon frequency.

The beacon transmission rate may also be adaptively varied in response to the intensity, or lack thereof, of traffic along a particular communication channel. A node that senses that the wireless communications channel is relatively lightly loaded with user data traffic may transmit beacons more frequently, but slow down the beacon rate as the user traffic increases.

As a result, network control traffic can be propagated quickly during periods which do not have a great deal of user traffic. Conversely, the control traffic load is decreased to a minimum during high user traffic in order to assure speedy delivery of the user traffic throughout the network.

The level of traffic may be determined, for example, by direct measurements of the wireless channel itself, by control traffic protocols with other nodes, by measuring its own internal queue lengths, by performing predictive algorithms, or by any combination of the preceding techniques.

Figure 9:
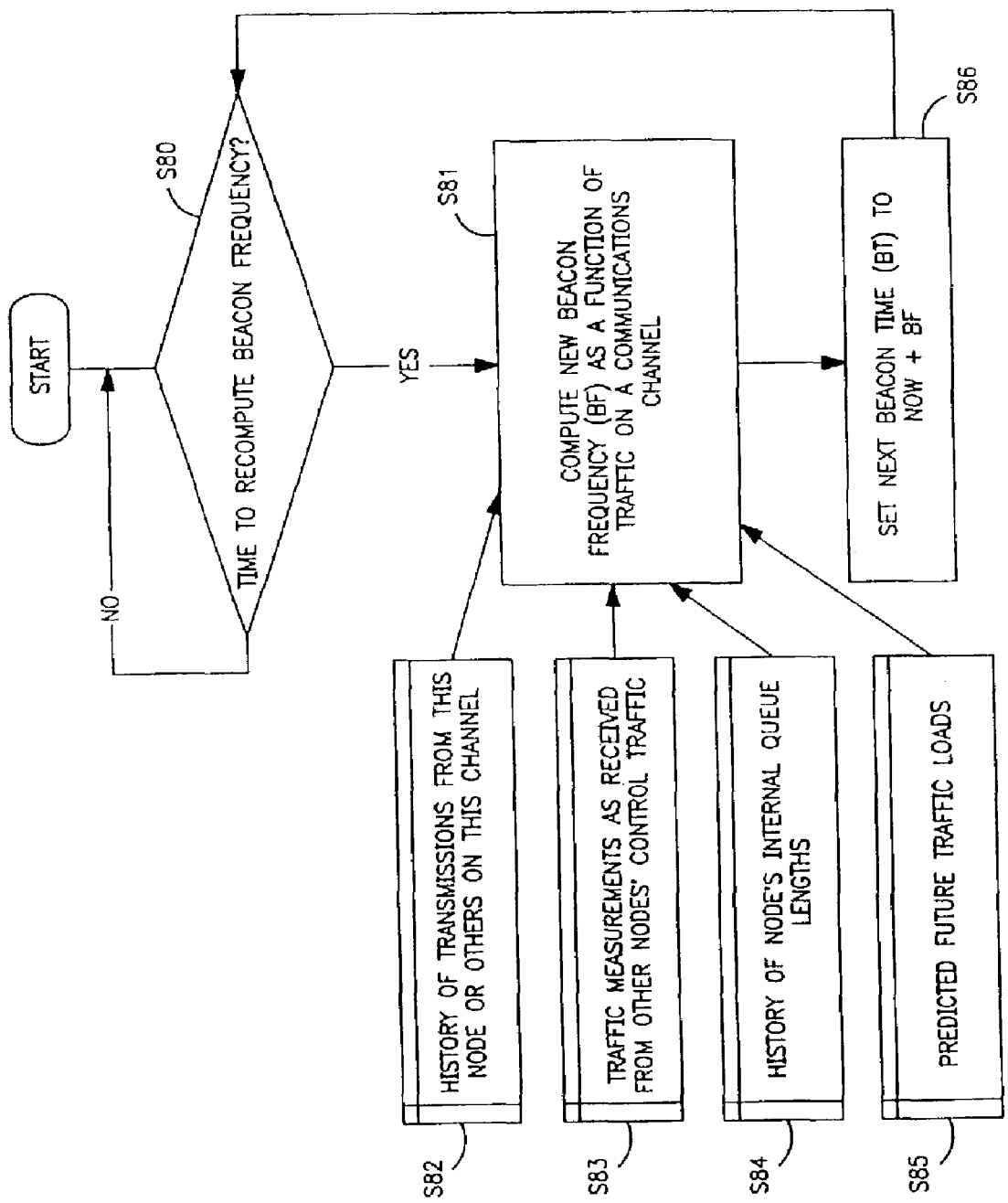
FIG. 9 is a flowchart illustrating a procedure for varying the rate at which beacons are transmitted by a router in response to the amount of data traffic in a wireless communication channel.

The Traffic-Dependent Beaconing procedure is illustrated in FIG. 9. After determining that it is time to recompute the beacon frequency in step S80, the new beacon frequency is calculated as a function of traffic on a communications channel in step S81. The intensity of traffic moving along a communications channel can be determined based on several types of data, including the history of transmissions from this node or others on this channel (S82); the traffic measurements as received from other nodes' control traffic (S83); the history of the node's internal queue lengths (S84); and the predicted future traffic loads (S85). In step S86, the next beacon time is set to be the current time plus the calculated beacon frequency.

The beacon transmission rate may also be based on the amount of power available for wireless channel transmissions. A node that has a greater need to conserve power may transmit beacons at a slower rate than a node that has less of a need to conserve power. The Power-Dependent Beaconing algorithm helps to conserve available power and also directs nodes toward interactions with the nodes that beacon more freely since they have less of a need to conserve power.

Figure 10:
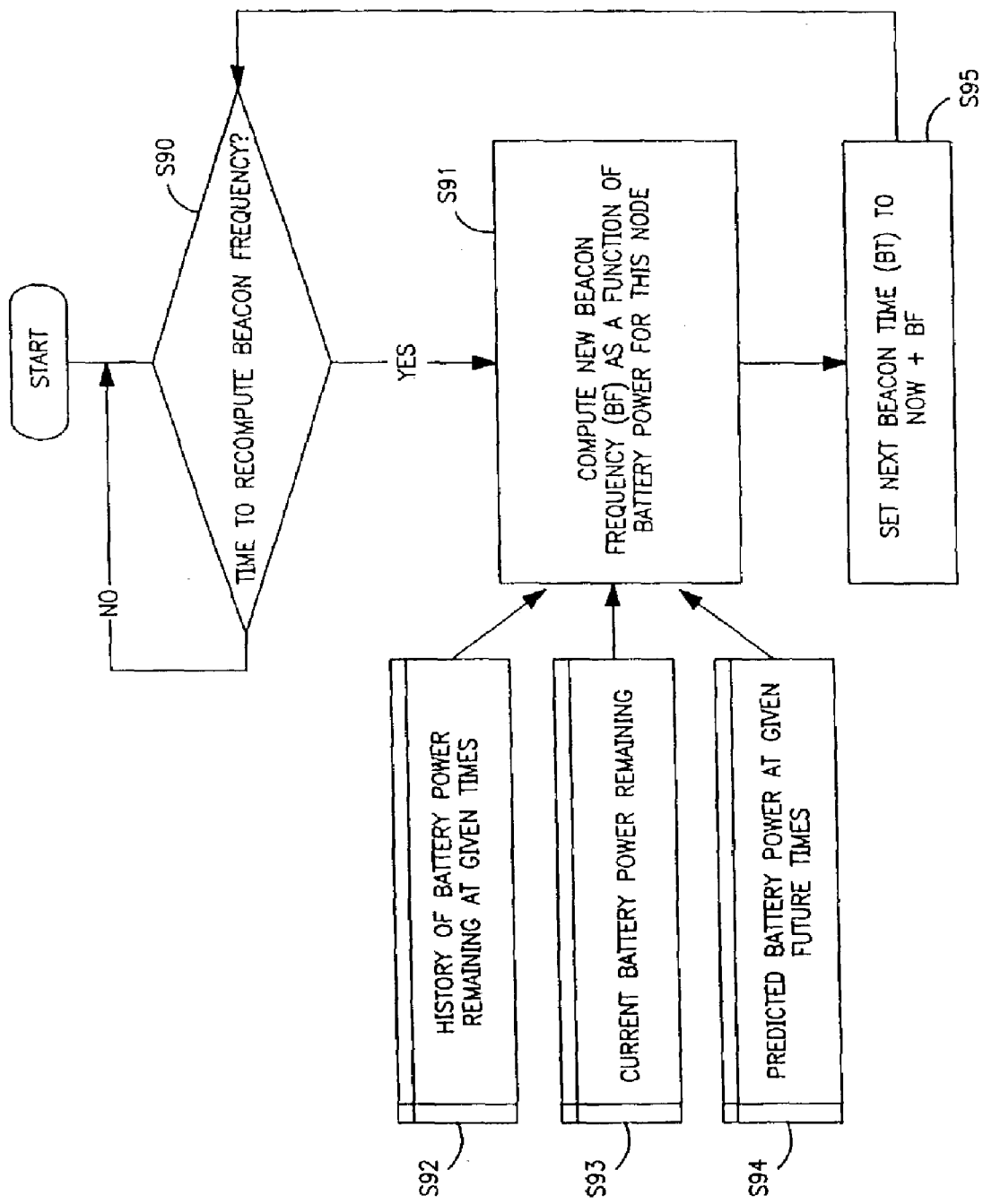
FIG. 10 is a flowchart illustrating a procedure for varying the rate at which beacons are transmitted by a router in response to the amount of power available to the router for wireless channel transmissions.

FIG. 10 is a flowchart illustrating a procedure for varying the rate at which beacons are transmitted by a router in response to the amount of power available to the router for wireless channel transmissions. If in step S90 it is determined that it is time to recompute the beacon frequency, then the new beacon frequency is computed as a function of battery power for the node in step S91. Information such as the history of battery power remaining at given times (S92), the current battery power remaining (S93), and the predicted power at given future times (S94) can be used to calculate this new beacon frequency. In step S95, the next beacon time is determined by adding the current time to the new beacon frequency computed in step S91.

The rate of beacon transmission is also varied based on an assessment of the loads which are affiliated with a node. A node that has greater demands on one or more of its resources will transmit beacons at a slower rate than a node which has fewer demands on its resources.

For example, in a cluster-based network, a cluster head that is servicing many cluster members may transmit beacons less often than one that is servicing fewer members. Similarly, in a network with name servers, the busier name server may beacon less often than those that are less busy.

The Load-Dependent Beaconing algorithm computes the beacon rate for a node based, in whole or in part, on application-dependent load factors. Such a procedure helps to bias other network node toward interactions with nodes that are relatively unloaded.

Figure 11:
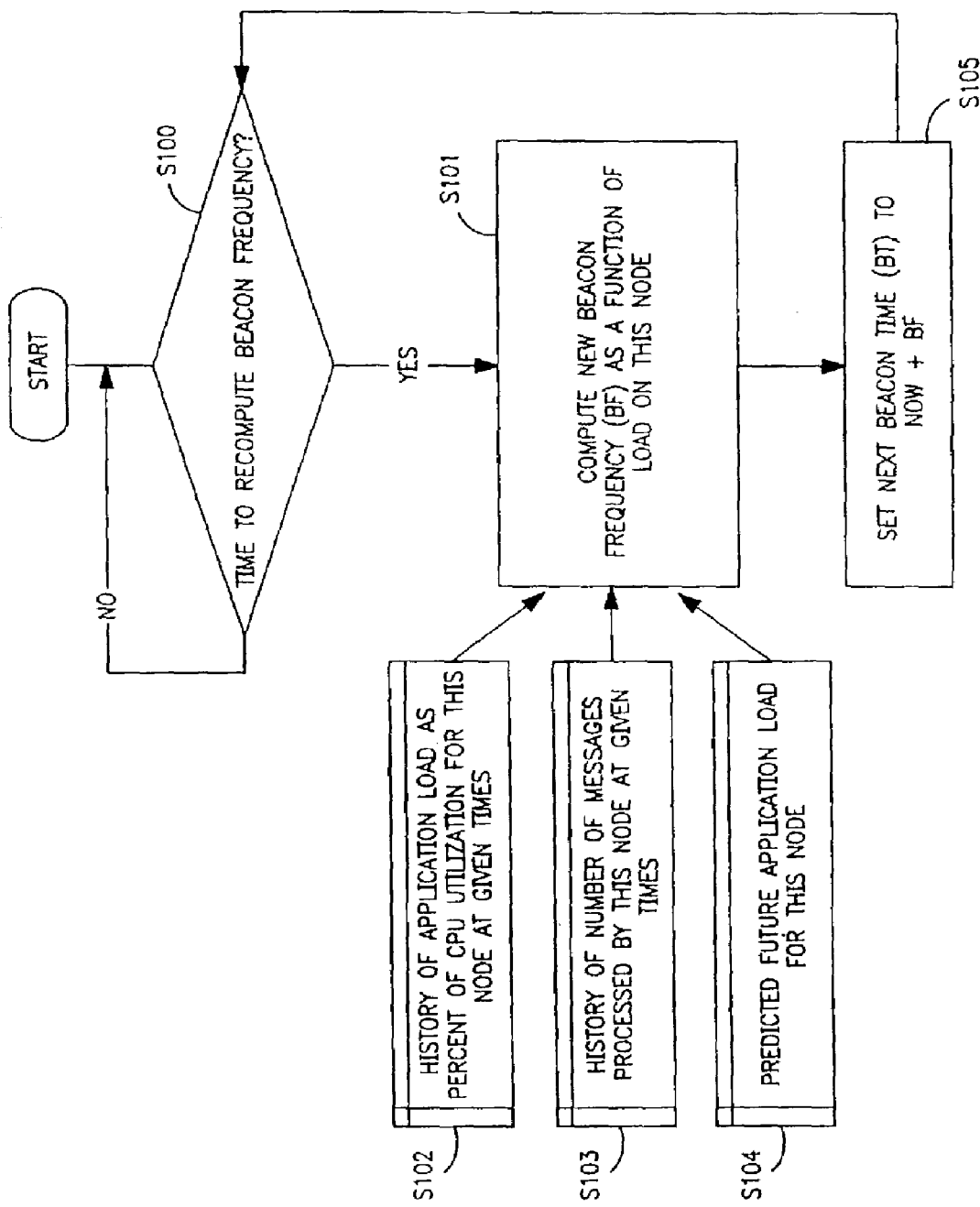
FIG. 11 is a flowchart illustrating a procedure for varying the rate at which beacons are transmitted by a router in response to an application load.

FIG. 11 illustrates this Load-Dependent Beaconing procedure for varying the beacon transmission rate in response to an application load.

If it is time to recompute the beacon frequency (step S100), then the new beacon frequency is computed in step S101 as a function of the load on the node. The history of the application load as a percent of CPU utilization for the node at given times (S102), the history of the number of messages processed by the node at given times (S103), and the predicted future application load for the node are factored into the computation of the new beacon frequency. In step S105, the next beacon time is computed to be the current time plus the new beacon frequency that was calculated in step S101.

While the present invention has been described with respect to what are presently considered to be the preferred embodiments, it is to be understood that the invention is not limited to the disclosed embodiments. The present invention is intended to cover various modifications and equivalent arrangements included within the spirit and scope of the appended claims.

For example, the radio network has been described as having five communication nodes (FIG. 2). However, the network can include any number of nodes. Also, as will be appreciated by those skilled in the art, the methods and control logic, as described herein, can be embodied in a programmable computer or computer executable software that is stored on computer readable media, for example, on a floppy disk, RAM, ROM, a hard disk, removable medium, flash memory, memory sticks, optical medium, magneto-optical mediums, etc.

Additionally, the described methods, structure, and functions are directed to wireless mobile communications stations that automatically configure themselves in a mobile communications network, with each mobile station directing its respective affiliation. However, control of such configurations could be centralized to cluster heads, for example, which would then direct affiliation on a network level to optimize the network. Furthermore, the above methods and structure are not limited to wireless communications networks.

The current invention is applicable to network schemes in which all of the nodes beacon, and to networks in which only a subset of the nodes broadcast beacons. The invention is also applicable to both routers/switches and endpoint devises in ad hoc wireless networks.

Moreover, although the current invention has been described with reference to the seven algorithms above, many other algorithms are possible as factors that can impact the dynamic adaptability of the beacon transmission rate of a node.

What is claimed:

1. An apparatus for varying how frequently beacons are transmitted in an ad hoc wireless network, comprising:
at least one mobile router, said mobile router for (i) transmitting beacons containing data, (ii) controlling how frequently the beacons are transmitted, and (iii) adaptively varying how frequently the beacons are transmitted in response to a condition of said mobile router.

2. An apparatus according to claim 1, wherein said router is equipped with a wireless communications transceiver.

3. An apparatus according to claim 2, wherein the data transmitted by the beacons identifies said router transmitting the beacons.

4. An apparatus according to claim 2, wherein the data transmitted by the beacons contains forward error corrections.

5. An apparatus according to claim 2, wherein the data transmitted by the beacons indicates how frequently the beacons are currently being transmitted.

6. An apparatus according to claim 1, wherein said router performs network routing functions.

7. An apparatus according to claim 1, wherein said router is a destination for data traffic.

8. An apparatus according to claim 1, wherein how frequently said beacons are transmitted is varied in response to a start-up operation of said router.

9. An apparatus according to claim 8, wherein the start-up operation occurs when said router first enters a network.

10. An apparatus according to claim 8, wherein the start-up operation occurs when said router first begins to act with a new role in a network.

11. An apparatus according to claim 8, wherein the router transmits the beacons more frequently in response to the start-up operation.

12. An apparatus according to claim 11, wherein the router transmits the beacons less frequently after a predetermined period of time after the start-up operation.

13. An apparatus according to claim 1, wherein the router varies how frequently the router transmits the beacons in response to a mobility rate of said router.

14. An apparatus according to claim 13, wherein the router transmits the beacons more frequently in response to an increase in the mobility rate of said router.

15. An apparatus according to claim 13, wherein the router transmits the beacons less frequently in response to a decrease in the mobility rate of said router.

16. An apparatus according to claim 13, wherein the mobility rate is measured by physical speed.

17. An apparatus according to claim 13, wherein the mobility rate is measured by a change in wireless channel connectivity with other routers.

18. A method for varying how frequently beacons are transmitted in an ad hoc wireless network, comprising the steps of:
   transmitting from a mobile network node beacons containing data;
   controlling how frequently beacons are transmitted from the mobile network node; and
   adaptively varying how frequently the beacons are transmitted in response to a condition of said mobile network node.

19. Computer-executable software code stored on a computer-readable medium, the computer-executable code for facilitating the transmission of beacons in an ad hoc wireless network, the computer-executable code comprising:
   computer-executable code for transmitting from a mobile network node beacons containing data;
   computer-executable code for controlling how frequently the beacons are transmitted from the mobile network node; and
   computer-executable code for adaptively varying how frequently the beacons are transmitted in response to a condition of said router.

20. A network communication apparatus comprising:
   means for transmitting from a mobile network node beacons containing data;
   means for controlling how frequently beacons are transmitted from the mobile network node; and
   means for adaptively varying how frequently the beacons are transmitted in response to a condition of said mobile network node.

21. An apparatus for varying the frequency with which beacons are transmitted in an ad hoc wireless network, comprising:
   at least one mobile router, said mobile router (i) transmitting beacons containing data, (ii) controlling how frequently beacons are transmitted, and (iii) adaptively varying how frequently the beacons are transmitted in response to a condition of said mobile router,
   wherein how frequently the beacons are transmitted is varied in response to an application load of said router.

22. An apparatus according to claim 21, wherein the router transmits the beacons more frequently in response to an application load that is small.

23. An apparatus according to claim 21, wherein the router transmits the beacons less frequently in response to an application load that is large.

24. An apparatus according to claim 21, wherein said router is equipped with a wireless communications transceiver.

25. An apparatus according to claim 24, wherein the data transmitted by the beacons identifies said router transmitting the beacons.

26. An apparatus according to claim 24, wherein the data transmitted by the beacons contains forward error corrections.

27. An apparatus according to claim 24, wherein the data transmitted by the beacons indicates how frequently the beacons are currently being transmitted.

28. An apparatus according to claim 21, wherein said router is for performing network routing functions.

29. An apparatus according to claim 21, wherein said router is a destination for data traffic.

30. A method for varying the frequency with which beacons are transmitted from a router an ad hoc wireless network, comprising the steps of:
   transmitting beacons containing various types of data;
   controlling how frequently the router transmits beacons; and
   adaptively varying how frequently the router transmits beacons in response to an application load of the router.

31. A method according to claim 30, wherein the router transmits the beacons more frequently in response to an application load that is small.

32. A method according to claim 30, wherein the router transmits the beacons less frequently in response to an application load that is large.

33. A method according to claim 30, wherein the router is equipped with a wireless communications transceiver.

34. A method according to claim 33, wherein the data transmitted by the beacons identifies the router transmitting the beacons.

35. A method according to claim 33, wherein the data transmitted by the beacons contains forward error corrections.

36. A method according to claim 33, wherein the data transmitted by the beacons indicates how frequently the router is currently transmitting beacons.

37. A method according to claim 30, wherein the router is for performing network routing functions.

38. A method according to claim 30, wherein the router is a destination for data traffic.

39. Computer-executable software code stored on a computer-readable medium, the computer-executable code for facilitating the transmission of beacons from a router in an ad hoc wireless network, the computer-executable code comprising:
   computer-executable code for transmitting beacons containing various types of data;
   computer-executable code for controlling how frequently the router beacons are transmitted; and
   computer-executable code for adaptively varying how frequently the router transmits the beacons in response to an application load of the router.

40. Computer-executable software code according to claim 39, wherein the router transmits the beacons more frequently in response to an application load that is small.

41. Computer-executable software code according to claim 39, wherein the router transmits the beacons less frequently in response to an application load that is large.

42. Computer-executable software code according to claim 39, wherein the router is equipped with a wireless communications transceiver.

43. Computer-executable software according to claim 42, wherein the data transmitted by the beacons identifies the router transmitting the beacons.

44. Computer-executable software code according to claim 42, wherein the data transmitted by the beacons contains forward error corrections.

45. Computer-executable software code according to claim 42, wherein the data transmitted by the beacons indicates how frequently the router is currently transmitting beacons.

46. Computer-executable software code according to claim claim 39, wherein the router is for performing network routing functions.

47. Computer-executable software code according to claim 39, wherein the router is a destination for data traffic.

48. A network router comprising:
 means for transmitting beacons containing various types of data;
 means for controlling how frequently the router transmits the beacons; and
 means for adaptively varying how frequently the router transmits the beacons in response to an application load of the router.

49. A network router according to claim 48, wherein the router transmits the beacons more frequently in response to an application load that is small.

50. A network router according to claim 48, wherein the router transmits the beacons less frequently in response to an application load that is large.

51. A network router according to claim 48, wherein said router is equipped with a wireless communications transceiver.

52. A network router according to claim 51, wherein the data transmitted by the beacons identifies said router transmitting the beacons.

53. A network router according to claim 51, wherein the data transmitted by the beacons contains forward error corrections.

54. A network router according to claim 51, wherein the data transmitted by the beacons indicates how frequently the router is currently transmitting the beacons.

55. A network router according to claim 48, wherein said router is for performing network routing functions.

56. A network router according to claim 48, wherein said router is a destination for data traffic.

* * * * *